United States Patent
Si (10) Patent No.: US 8,075,435 B2
(45) Date of Patent: Dec. 13, 2011

(54) DUAL MODE INPUT SPLIT COMPOUND SPLIT CONFIGURATION EPPV TRANSMISSION

(75) Inventor: Baojun Si, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 678 days.

(21) Appl. No.: 12/196,970

(22) Filed: Aug. 22, 2008

(65) Prior Publication Data

US 2010/0048338 A1    Feb. 25, 2010

(51) Int. Cl.
    *F16H 3/72*    (2006.01)
(52) U.S. Cl. .................................................. 475/5
(58) Field of Classification Search .......... 475/5, 269, 475/275, 277, 282, 296, 330, 288, 317
    See application file for complete search history.

(56) References Cited

U.S. PATENT DOCUMENTS

| | | | |
|---|---|---|---|
| 5,419,406 A | 5/1995 | Kawamoto et al. | |
| 5,730,676 A | 3/1998 | Schmidt | |
| 5,931,757 A | 8/1999 | Schmidt | |
| 6,090,005 A | 7/2000 | Schmidt et al. | |
| 6,234,930 B1 | 5/2001 | Kaneko et al. | |
| 6,551,208 B1 | 4/2003 | Holmes et al. | |
| 6,558,588 B2 | 5/2003 | Shioiri et al. | |
| 6,953,409 B2 | 10/2005 | Schmidt et al. | |
| 6,962,545 B2 | 11/2005 | Larkin et al. | |
| 6,964,627 B2 | 11/2005 | Ai et al. | |
| 7,128,675 B2 | 10/2006 | Klemen et al. | |
| 7,169,074 B2 | 1/2007 | Raghavan et al. | |
| 7,179,186 B2 | 2/2007 | Bucknor et al. | |
| 7,192,373 B2 * | 3/2007 | Bucknor et al. | 475/5 |
| 7,220,201 B2 * | 5/2007 | Raghavan et al. | 475/5 |
| 7,232,393 B2 * | 6/2007 | Bucknor et al. | 475/5 |
| 7,278,941 B2 * | 10/2007 | Holmes et al. | 475/5 |
| 7,473,199 B2 * | 1/2009 | Bucknor et al. | 475/5 |
| 7,594,868 B1 * | 9/2009 | Pollman | 475/5 |
| 7,727,112 B2 * | 6/2010 | Kakinami et al. | 477/79 |
| 2002/0002094 A1 | 1/2002 | Kmicikiewicz | |
| 2007/0265128 A1 | 11/2007 | Conlon | |
| 2009/0318261 A1 * | 12/2009 | Tabata et al. | 477/3 |

* cited by examiner

*Primary Examiner* — David D Le
*Assistant Examiner* — David J Hlavka
(74) *Attorney, Agent, or Firm* — Leydig, Voit & Mayer (57) ABSTRACT

An improved dual mode EPPV transmission hybrid electric drive system uses a combination of power sources including an internal combustion engine, a first electric motor, and a second electric motor, and provides more efficient operation and compact installation. The improved dual mode EPPV transmission hybrid electric drive system includes a first planetary gear set including a first sun gear linked to a first ring gear via a pinion on a first carrier, and a second planetary gear set including a second sun gear linked to a second ring gear via a pinion on a second carrier, wherein the various elements of the planetary gear sets are configured to allow a dual mode synchronous shift operation. The system includes a first clutch and a second clutch, both of which may be dry clutches, for changing the mode of the transmission from a high mode to a low mode and vice versa.

12 Claims, 7 Drawing Sheets

DUAL MODE INPUT SPLIT COMPOUND SPLIT CONFIGURATION EPPV TRANSMISSION

TECHNICAL FIELD

This disclosure relates generally to electric drive systems and configurations and, more particularly, to a dual electric drive parallel path variable transmission.

BACKGROUND

Many types and sizes of powered mobile machines are used in construction, quarrying, and other industrial activities, including wheel-loaders, off-highway trucks, truck-type tractors, excavators, and other on-highway and off-highway machines. Such machines are typically propelled over the ground by any one of a number of available propulsion sources. Traditionally, such machines included a single power source, e.g., an internal combustion engine, coupled to wheels or tracks via a transmission. However, such an arrangement has the disadvantage that the engine must accelerate and decelerate between transmission ratios, and is thus generally not able to operate for extended periods of time within its optimal operating band. Moreover, the single power source must be sized so that it can accommodate everything from the smallest to the largest power loads that may potentially be faced by the machine. Given this, the power source is often greatly oversized for most loads placed upon it, leading to inefficient use of fuel.

As a partial solution to some of these problems, hybrid power sources began to see increased popularity. A traditional hybrid power source includes an engine, e.g., an IC engine, coupled to a generator. As the engine turns the generator, electrical energy is created and stored and, when needed, consumed. The electrical energy is used to drive one or more electric motors that provide the torque needed, via a transmission, to propel the machine. The ability to store electrical energy means that the engine can operate in a fuel-efficient steady state mode regardless of the varying power requirements of the machine. This traditional hybrid design is often referred to as a "series" hybrid design.

While the series hybrid design is fairly efficient and still enjoys widespread popularity, it does come with a number of drawbacks. For example, because the electrical motor or motors must supply all of the needed torque, these components must be somewhat overbuilt to anticipate all potential loads. This increases the cost and weight of the machine, and decreases the maximum efficiency of the machine.

In response to the various problems associated with single drive and series hybrid drive power schemes, the "parallel" hybrid drive power system was created. As the term is used herein, a parallel hybrid drive power system is one in which two different types of power source are used simultaneously to provide torque to the machine tracks or wheels. One of the power sources may also act as a source of power for the other power source. For example, an IC/electric parallel hybrid drive system uses both an IC engine and an electric motor to turn the wheels or tracks, but the engine also drives a generator that provides power for the electric motor.

Of particular interest for the present application is a type of IC/electric parallel hybrid power/transmission system known as an input split parallel path variable transmission. This system includes a transmission that receives power from the machine's engine and delivers power to wheels or tracks in order to propel the machine. One or more motor/generators linked into the transmission are also connected to energy storage devices, such as a battery, which accepts power from, and supplies power to, the motor/generators.

The transmission includes one or more planetary gear sets through which the engine and the one or more motor/generators are linked to one another and to the output shaft of the transmission. Selective engagement, disengagement, braking and clutching are used within the transmission to control the balance of power between the power sources and to define the relationship between the power sources and the transmission output in any given mode and/or gear.

The planetary gear system as configured in the aforementioned transmission is very useful in combining power from the multiple power sources. However, the efficiency of the transmission is less than ideal, and depends largely upon the degree of power mixing at any moment. For example, while the extensive use of both power sources is required during transient states, the overall system efficiency will be highest when the output power is derived exclusively from the engine.

When considering this background section, the disclosure and claims herein should not be limited by the deficiencies of the prior art. In other words, the solution of those deficiencies, while desirable, is not a critical limitation of any claim except where otherwise expressly noted in that claim. Moreover, while this background section is presented as a convenience to the reader who may not be of skill in this art, it will be appreciated that this section is too brief to attempt to accurately and completely survey the prior art. The preceding background description is thus necessarily concise and is not intended to replace printed references in the art. To the extent an inconsistency or omission between the demonstrated state of the printed art and the foregoing narrative exists, the foregoing narrative is not intended to cure such inconsistency or omission. Rather, applicants would refer to the demonstrated state of the printed art.

SUMMARY

In one aspect, dual mode input split compound split configuration EPPV transmission drive system includes an internal combustion engine, a first electric motor, and a second electric motor linked into a multi-mode transmission which combines the received rotational power into a transmission output power for propelling a machine. The transmission includes a first planetary gear set including a first sun gear linked to a first ring gear via a pinion on a first carrier, the first ring gear receiving rotational power from the engine output and the first sun gear being rotationally fixed to the first electrical motor.

The transmission further includes a second planetary gear set including a second sun gear linked to a second ring gear via a pinion on a second carrier, the second carrier being rotationally fixed to the first carrier and to a transmission output, and the second ring gear being rotationally fixed to the second electrical motor. A first clutch within the transmission selectively links the first sun gear to the second sun gear while a second clutch selectively brakes the second sun gear. In this configuration, when the first clutch is engaged, the transmission exhibits a first mode of power transmission characteristics and when the second clutch is engaged the transmission exhibits a second and distinct mode of power transmission characteristics.

Other features and advantages flowing from the disclosed principles will be appreciated from the following description, taken in conjunction with the drawings, of which:

DETAILED DESCRIPTION

This disclosure pertains primarily to dual mode input split compound split configuration EPPV transmission drive systems and the described principles are set forth in particularity with reference to an IC/electric parallel path variable transmission. However, although the discussion herein focuses upon an IC/electric version of this system, it will be appreciated that the disclosed principles also have beneficial applicability with respect to other systems such as IC/hydrostatic power systems.

Figure 1:
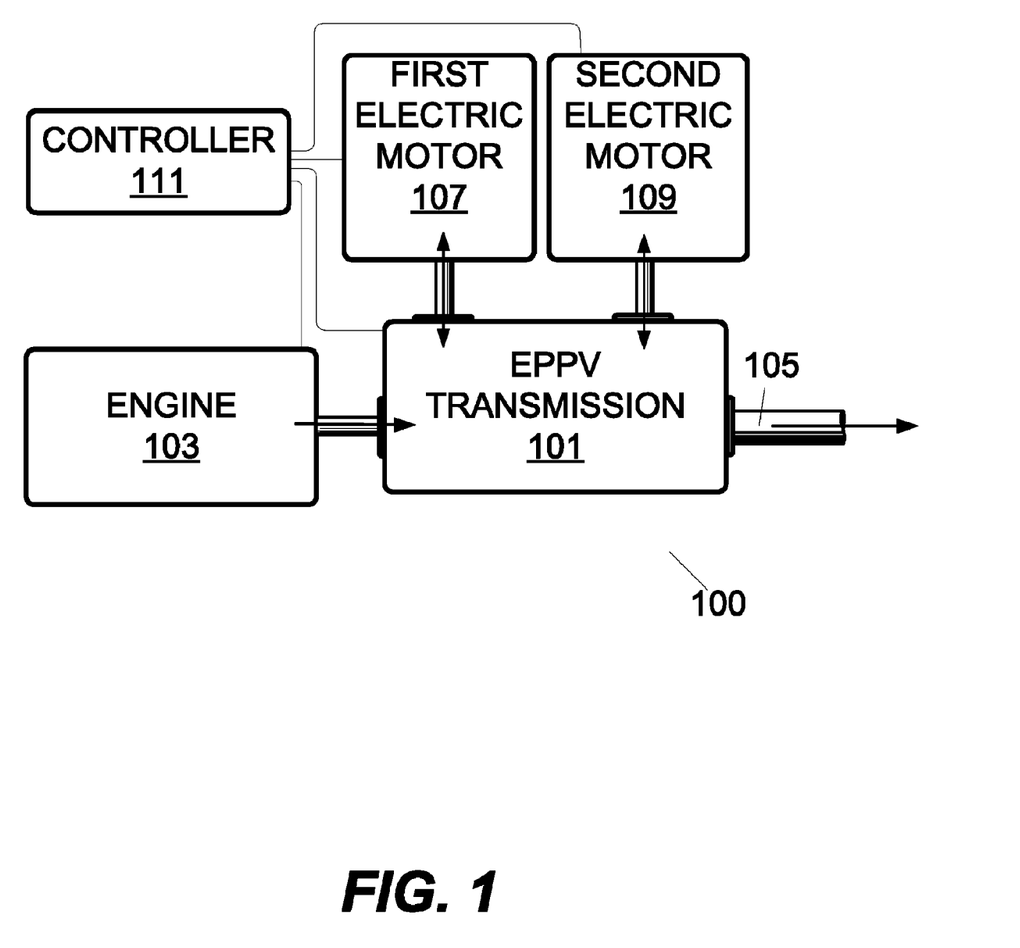
FIG. 1 is a simplified schematic view of power system 100 including an IC/electric parallel path continuously variable transmission in accordance with the disclosed principles.

FIG. 1 is a simplified schematic view of power system 100 including an IC/electric parallel path continuously variable transmission 101. The particular details of the transmission 101 will be discussed in greater detail with respect to other figures. The transmission 101 receives rotary power from an IC engine 103. However, the IC engine is not directly coupled to the transmission output 105. Rather, the IC engine is coupled to the transmission output 105 via a series of planetary gear systems that also receive rotary power from a number of other power sources including a first electric motor 107 and a second electric motor 109. The power sharing and effect of the various power sources is established by a number of internal elements within the transmission 101, e.g., one or more brakes and clutches (not shown). A controller 111 coordinates the operation of the first electric motor 107 and the second electric motor 109 as well as the mode and ratio of the transmission 101.

The operation of the transmission 101 is advantageously such that the transmission provides variable output speeds in multiple modes, with generally greater volume density and energy efficiency than was provided by prior systems. The multiple modes may include, e.g., a low speed range and a high speed range. The transmission 101 also supports synchronous mode changes, improving the user experience, and the use of a dry clutch, improving system compactness. The first electric motor 107 and the second electric motor 109 are used to vary the output speed at the transmission output 105 within each mode, while the clutch and brake are used to select the mode of the transmission 101. The planetary gear systems within the transmission 101 may include one or both of single and double-pinion gear sets.

Figure 2:
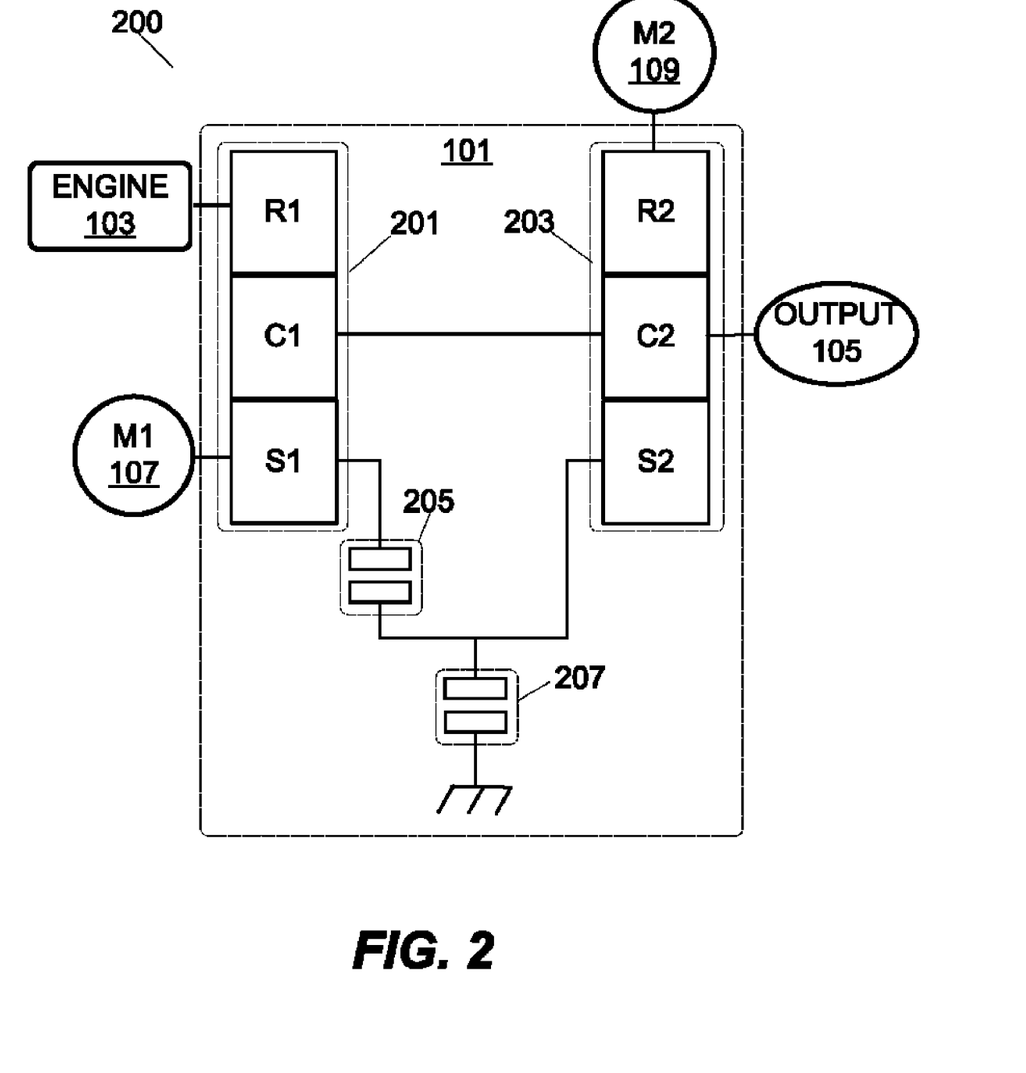
FIG. 2 is a schematic illustration of an implementation of a drive system including an implementation of a transmission in accordance with the disclosed principles.

FIG. 2 is a schematic illustration of an implementation of first drive system 200 including an implementation of the transmission 101 in keeping with the disclosed principles. The power system of FIG. 2 includes the elements shown FIG. 1, namely the transmission 101, IC engine 103, transmission output 105, first electric motor 107, second electric motor 109 and the controller 111 (not shown expressly in FIG. 2). However, the planetary gear systems and associated components within the transmission 101 are also shown in detail with respect to the first drive system 200 of FIG. 2.

In the implementation shown in FIG. 2, the transmission 101 of the first drive system 200 includes a first planetary gear system 201 and a second planetary gear system 203 that are selectively linkable as will be described more fully below. The first planetary gear system 201 comprises a first sun gear S1 coupled to a first ring gear R1 via one or more planet gears set in a first carrier C1. The second planetary gear system 203 comprises a second sun gear S2 coupled to a second ring gear R2 via one or more planet gears set in a second carrier C2.

The IC engine 103 is coupled into the first ring gear R1 and the transmission output 105 is coupled out of the second carrier C2. The first carrier C1 is coupled to the second carrier C2. The first sun gear S1 receives power from the first electric motor 107, while the second electric motor 109 is linked to the second ring gear R2. A first clutch 205 selectively links the first sun gear S1 to the second sun gear S2, and a second clutch 207 selectively brakes the second sun gear S2. Although the exact gears and pinion ratios are not critical, an exemplary tooth count ratio is as follows: first planet gear ratio is 3.5, second gear ratio is 2.14.

In operation, activation of the first clutch 205 places the transmission 101 in a high speed range, whereas activation of the second clutch 207 places the transmission 101 in a low speed range. Considering first the movement of the various components of the transmission 101 in the low speed range, when the IC engine 103 rotates the first ring gear R1, the first carrier C1 rotates at a speed dictated by the speed of the IC engine 103 and the first electric motor 107 and in a direction dictated by the direction of rotation of the first electric motor 107. The rotation of the first carrier C1 is transferred to the second carrier C2. With the second clutch 207 selectively braking the second sun gear S2, the movement of the second carrier C2, in addition to providing output rotation at the transmission output 105, also causes the second electric motor 109 to rotate, generating electrical power for consumption or storage.

When the first clutch 205 is engaged, linking the first sun gear S1 to the second sun gear S2, and a second clutch 207 is disengaged, freeing the second sun gear S2, the transmission 101 is in the second or "high speed" mode. In this configuration, when the IC engine 103 rotates the first ring gear R1, the first carrier C1 rotates at a speed dictated by the speed of the IC engine 103 and the second electric motor 109 and in a direction dictated by the rotation of the second electric motor 109. The rotation of the first carrier C1 is transferred to the second carrier C2. With the second sun gear S2 linked to the first sun gear S1, the rotation of the second electric motor 109 is conveyed to the first electric motor 107 via the first sun gear S1.

Although the first drive system 200 provides for an efficient and compact drive train, certain variations of the same principles will be appreciated from this description. By way of example, FIG. 3 includes a schematic illustration of an implementation of second drive system 300 including an implementation of the transmission 101 in keeping with the disclosed principles. The power system of FIG. 3 again generally includes the primary elements shown FIG. 1, and also includes a detailed view of an exemplary planetary gear system and associated components within the transmission 101.

Figure 3:
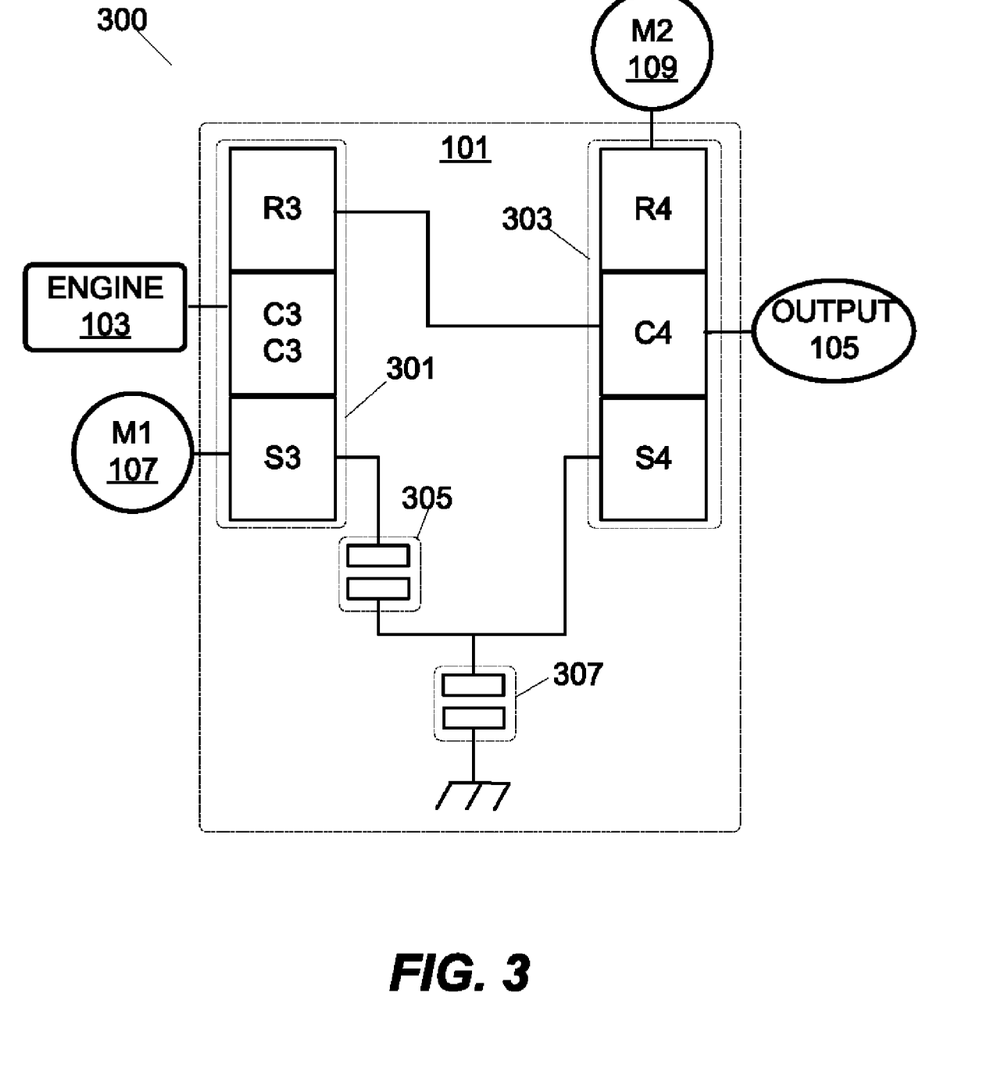
FIG. 3 is a schematic illustration of an implementation of a drive system including an alternative implementation of a transmission in accordance with the disclosed principles.

In the implementation shown in FIG. 3, the transmission 101 of the second drive system 300 includes a third planetary gear system 301 and a fourth planetary gear system 303 that are selectively linkable. The third planetary gear system 301 comprises a third sun gear S3 coupled to a third ring gear R3 via a double-pinion planet gear set in a third carrier C3/C3. The fourth planetary gear system 303 comprises a fourth sun gear S4 coupled to a fourth ring gear R4 via one or more planet gears set in a fourth carrier C4.

The IC engine 103 is coupled into the double-pinion planet gear set in the third carrier C3/C3 and the transmission output 105 is coupled out of the fourth carrier C4. The third ring gear R3 is coupled to the fourth carrier C2. The third sun gear S3 receives power from the first electric motor 107, while the second electric motor 109 is linked to the fourth ring gear R4. A third clutch 305 selectively links the third sun gear S3 to the fourth sun gear S4, and a fourth clutch 307 selectively brakes the fourth sun gear S4. Although the exact ratios of the various gears and pinions are not critical, exemplary ratios are as follows: first planet gear ratio is 2.76, second gear ratio is 2.14.

In operation of the second drive system 300, activation of the third clutch 305 places the transmission 101 in a high speed range, whereas activation of the fourth clutch 307 places the transmission 101 in a low speed range. Considering the movement of the various components of the transmission 101 in the low speed range, when the IC engine 103 rotates the double-pinion planet gear set in the third carrier C3/C3, the third ring gear R3 rotates at a speed dictated by the speed of the IC engine 103 and the first electric motor 107 and in a direction dictated by the rotation of the first electric motor 107. The rotation of the third ring gear R3 is transferred to the fourth carrier C4. With the fourth clutch 307 selectively braking the fourth sun gear S4, the movement of the fourth carrier C4, in addition to providing output rotation at the transmission output 105, also causes the second electric motor 109 to rotate, generating electrical power for consumption or storage.

When the third clutch 305 is engaged, linking the third sun gear S3 to the fourth sun gear S4, and the fourth clutch 307 is disengaged, freeing the fourth sun gear S4, the transmission 101 is in the second or "high speed" mode. In this configuration, when the IC engine 103 rotates the double-pinion planet gear set in the third carrier C3/C3, the third ring gear R3 rotates at a speed dictated by the speed of the IC engine 103 and the second electric motor 109 and in a direction dictated by the rotation of the second electric motor 109. The rotation of the third ring gear R3 is transferred to the fourth carrier C4. With the fourth sun gear S4 linked to the third sun gear S3, the rotation of the second electric motor 109 is conveyed to the first electric motor 107 via the third sun gear S3.

Figure 4:
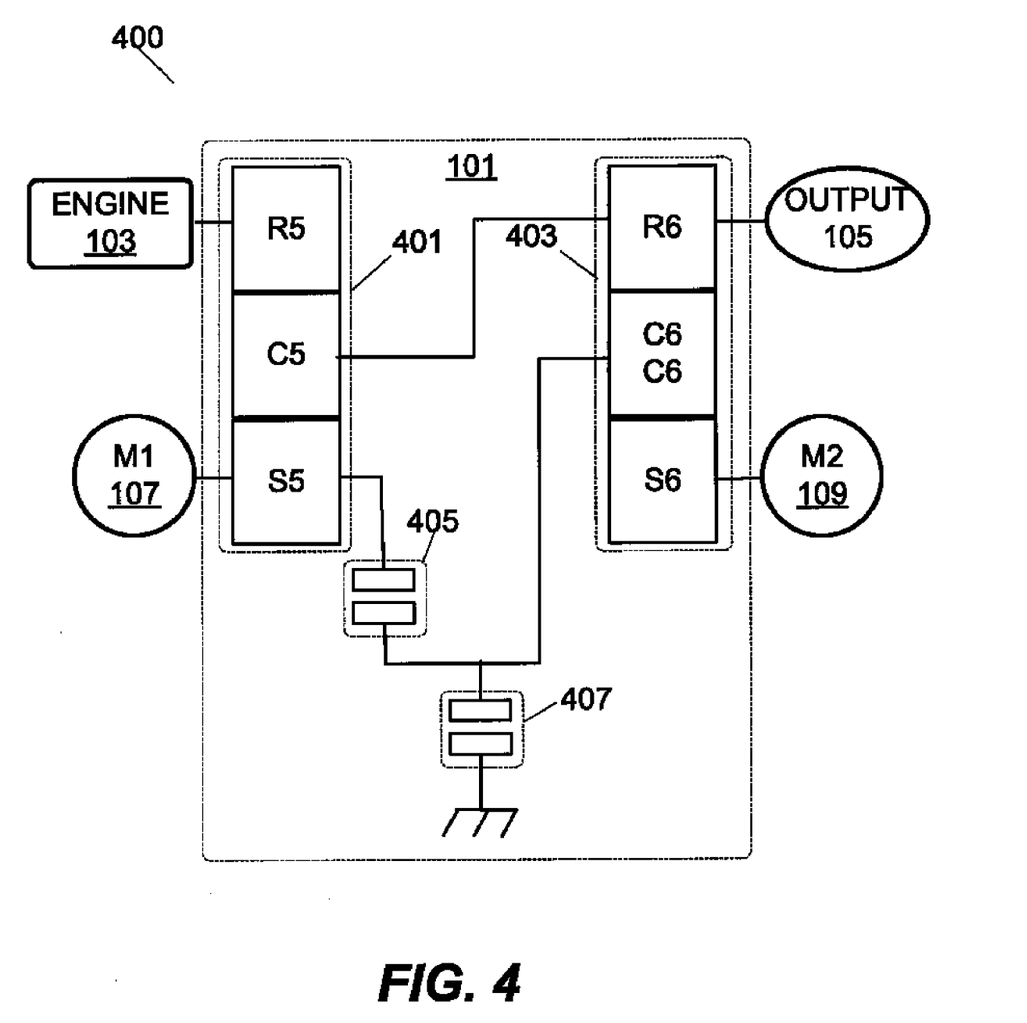
FIG. 4 is a schematic illustration of an implementation of a drive system including another alternative implementation of a transmission in accordance with the disclosed principles.

FIG. 4 is a schematic illustration showing yet another implementation of the disclosed principles. In the third drive system 400, the components are largely though not precisely the same as those illustrated with respect to the first drive system 200 and the second drive system 300. In particular, the third drive system 400 includes a fifth planetary gear system 401 and a sixth planetary gear system 403 that are selectively linkable. The fifth planetary gear system 401 comprises a fifth sun gear S5 coupled to a fifth ring gear R5 via a planet gear set in a fifth carrier C5. The sixth planetary gear system 403 comprises a sixth sun gear S6 coupled to a sixth ring gear R6 via a double-pinion planet gear set in a sixth carrier C6/C6.

The IC engine 103 is coupled into the fifth ring gear R5 and the transmission output 105 is coupled out of the sixth ring gear R6. The fifth ring gear R5 is coupled to the fifth carrier C5. The fifth sun gear S5 receives power from the first electric motor 107, while the second electric motor 109 is linked to the sixth sun gear S6. A fifth clutch 405 selectively links the fifth sun gear S5 to the sixth carrier C6/C6, and a sixth clutch 407 selectively brakes the sixth carrier C6/C6. Although the exact ratios of the various gears and pinions are not critical, exemplary ratios are as follows: first planet gear ratio is 2.56, second gear ratio is 2.04.

In operation of the third drive system 400, activation of the fifth clutch 405 places the transmission 101 in a high speed range, whereas activation of the sixth clutch 407 places the transmission 101 in a low speed range. Considering the movement of the various components of the transmission 101 in the low speed range, when the IC engine 103 rotates the fifth ring gear R5, the fifth carrier C5 rotates at a speed dictated by the speed of the IC engine 103 and the first electric motor 107 and in a direction dictated by the rotation of the first electric motor 107. The rotation of the fifth carrier C5 is transferred to the sixth ring gear R6. With the sixth clutch 407 selectively braking the sixth carrier C6/C6, the movement of the sixth ring gear R6, in addition to providing output rotation at the transmission output 105, also causes the second electric motor 109 to rotate, generating electrical power for consumption or storage.

When the fifth clutch 405 is engaged, linking the fifth sun gear S5 to the sixth carrier C6/C6, and the sixth clutch 407 is disengaged, freeing the sixth carrier C6/C6, the transmission 101 is in the second or "high speed" mode. In this configuration, when the IC engine 103 rotates the fifth ring gear R5, the fifth carrier C5 rotates at a speed dictated by the speed of the IC engine 103 and the second electric motor 109 and in a direction dictated by the rotation of the second electric motor 109. The rotation of the fifth carrier C5 is transferred to the sixth ring gear R6. With the fifth sun gear S5 linked to the sixth carrier C6/C6, the rotation of the second electric motor 109 is conveyed to the first electric motor 107 via the fifth sun gear S5.

Figure 5:
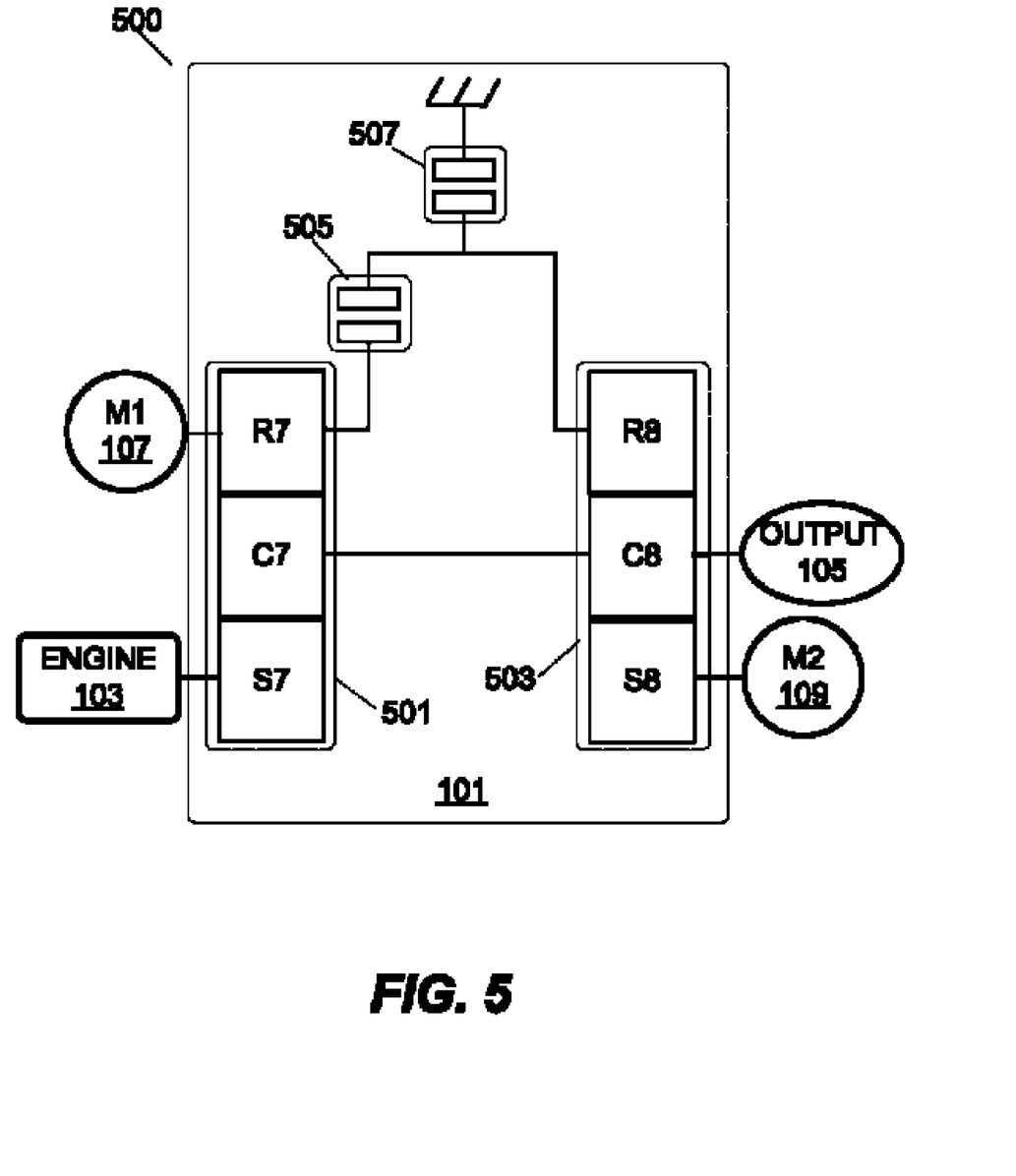
FIG. 5 is a schematic illustration of an implementation of a drive system including yet another alternative implementation of a transmission in accordance with the disclosed principles.

Another implementation of the disclosed principles is illustrated via the fourth drive system 500 shown schematically in FIG. 5. The fourth drive system 500 includes a seventh planetary gear system 501 and an eighth planetary gear system 503 that are selectively linkable. The seventh planetary gear system 501 comprises a seventh sun gear S7 coupled to a seventh ring gear R7 via a planet gear set in a seventh carrier C7. The eighth planetary gear system 503 comprises an eighth sun gear S8 coupled to an eighth ring gear R8 via a planet gear set in an eighth carrier C8.

The IC engine 103 is coupled into the seventh sun gear S7 and the transmission output 105 is coupled out of the eighth carrier C8. The seventh sun gear S7 is coupled to the seventh carrier C7. The seventh ring gear R7 receives power from the first electric motor 107, while the second electric motor 109 is linked to the eighth sun gear S8. A seventh clutch 505 selectively links the seventh ring gear S7 to the eighth ring gear S8, and an eighth clutch 507 selectively brakes the eighth ring gear S8. Although the exact ratios of the various gears and pinions are not critical, exemplary ratios are as follows: first planet gear ratio is 2.56, second gear ratio is 2.04.

In operation of the third drive system 500, activation of the seventh clutch 505 places the transmission 101 in a high speed range, whereas activation of the eighth clutch 507 places the transmission 101 in a low speed range. Considering the movement of the various components of the transmission 101 in the low speed range, when the IC engine 103 rotates the seventh sun gear S7, the seventh carrier C7 rotates at a speed dictated by the speed of the IC engine 103 and the first electric motor 107 and in a direction dictated by the rotation of the first electric motor 107. The rotation of the seventh carrier C7 is transferred to the eighth carrier C8. With the eighth clutch 507 selectively braking the eighth ring gear R8, the movement of the eighth carrier C8, in addition to providing output rotation at the transmission output 105, also causes the second electric motor 109 to rotate, generating electrical power for consumption or storage.

When the seventh clutch 505 is engaged, linking the seventh ring gear R7 to the eighth ring gear R8, and the eighth clutch 507 is disengaged, freeing the eighth ring gear R8, the transmission 101 is in the second or "high speed" mode. In this configuration, when the IC engine 103 rotates the seventh sun gear S7, the eighth carrier C8 rotates at a speed dictated by the speed of the IC engine 103 and the second electric motor 109 and in a direction dictated by the rotation of the second electric motor 109. The rotation of the seventh carrier C7 is transferred to the first electric motor 107 via the seventh ring gear R7.

Figure 6:
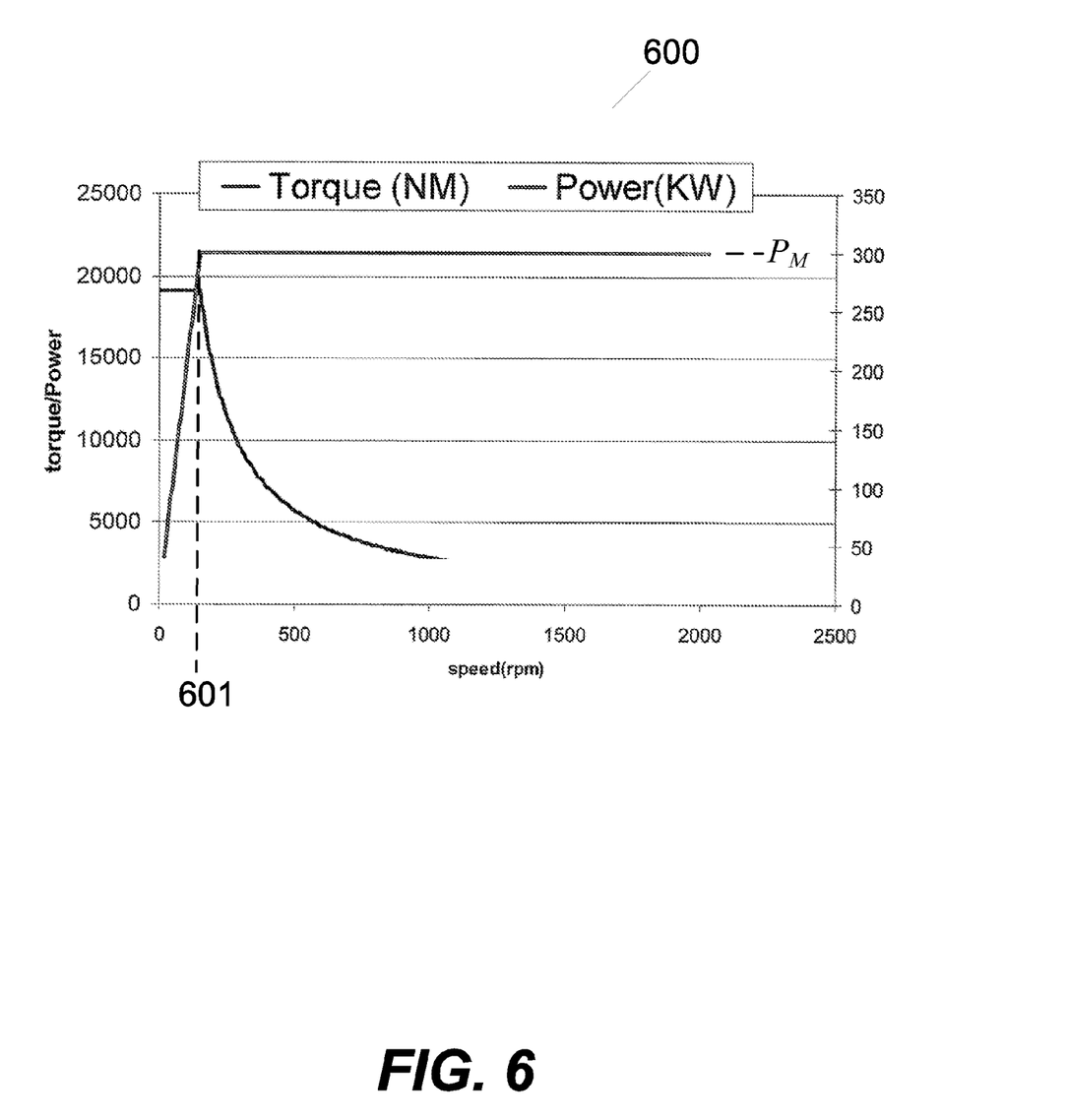
FIG. 6 is a graph illustrating torque and power characteristics provided by a drive system constructed and configured in accordance with the disclosed principles.

As previously noted, the transmission 101 provides efficient and compact operation. The torque and power characteristics provided by drive system described in various implementations above with reference to FIGS. 2-5 are illustrated graphically in FIG. 6 as a function of machine speed and system mode. The abscissa of the chart 600 shown in FIG. 6 represents the output shaft speed, while the ordinate represents the torque and power available from the drive system. As can be seen, the maximum torque provided by the system is highest at low speed in the low speed mode. The maximum output torque remains essentially unchanged in low speed mode, even as the machine speed increases. At shift point 601, the system mode changes from low speed to high speed mode, and the output torque drops asymptotically as a function of machine speed to a final torque value $T_F$.

With respect to available power, the power output of the system increases linearly from near zero at zero ground speed up to a maximum power $P_M$ at the shift point 601. After the shift point 601, the output power remains flat as a function of output speed. It can bee seen that there are no discontinuities in the zeroeth order, i.e., the torque and power do not exhibit any step-wise movements as a function of mode or speed. This ensures that the operator experience is satisfactory and reliable as the system transitions between modes, as well as when the system accelerates and decelerates.

Figure 7:
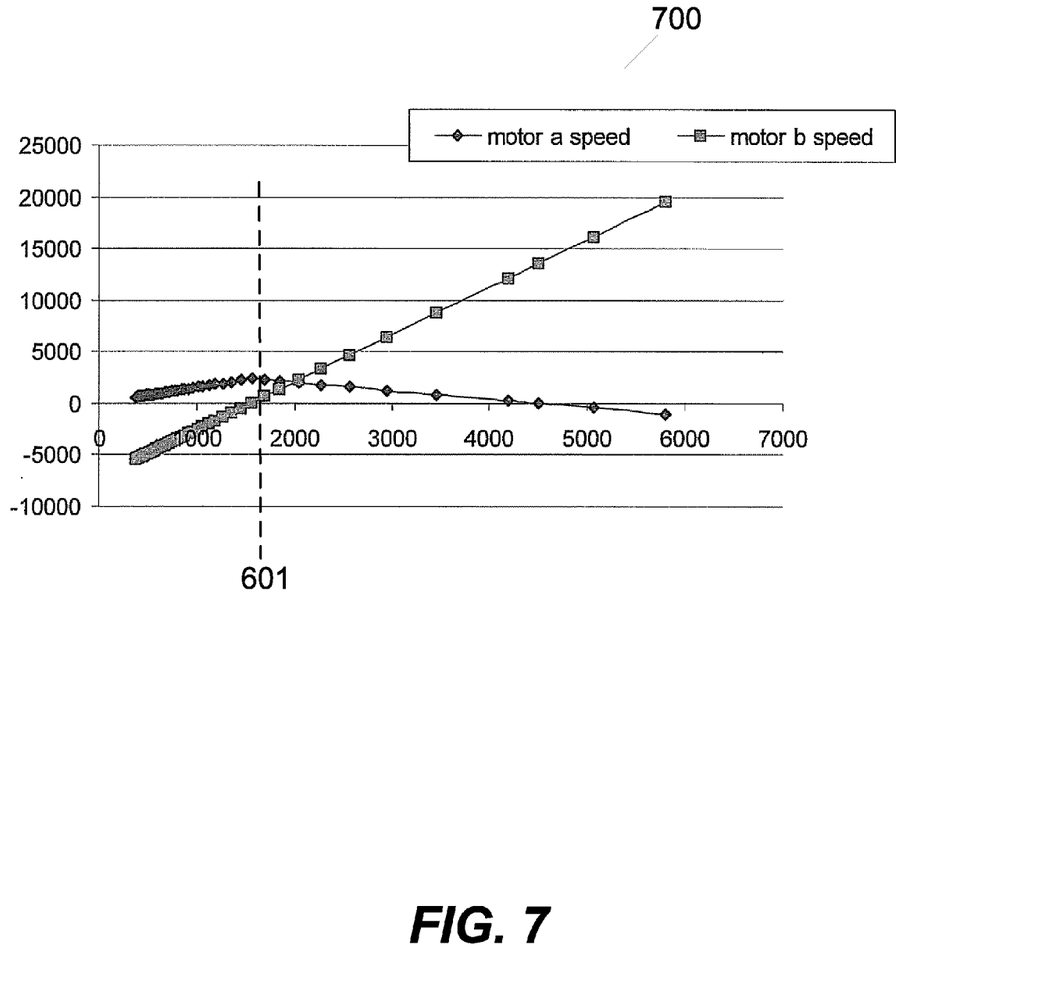
FIG. 7 is a graph illustrating motor speed characteristics for two electric motors within a drive system constructed and configured in accordance with the disclosed principles.

FIG. 7 shows a graph 700 illustrating motor speed characteristics for the first electric motor 107 and second electric motor 109 as the machine is accelerated using a drive system in keeping with the disclosed principles. It can bee seen that the speed of the first electric motor 107 ("motor a speed") increases up to the shift point 601 and then begins to decrease and eventually changes direction. In contrast, the speed of the second electric motor 109 ("motor b speed") increases monotonically as the machine accelerates. Thus, in this arrangement, at least one of the electric motors should be capable of sustained operation at high speeds, e.g., 20,000 RPM.

INDUSTRIAL APPLICABILITY

The present disclosure has applicability to series hybrid electric drive systems for machine propulsion, and in particular to IC/electric parallel path variable transmission systems. series hybrid electric drive systems according to the disclosed principles are usable to provide smooth propulsion over a wide speed and torque range while maintaining compact layout and efficient operation. The disclosed principles may be beneficially applied to many types of propelled machines including, without limitation, wheel-loaders, off-highway trucks, truck-type tractors, excavators, and other on-highway and off-highway machines.

Using the disclosed drive system, such machines are able to maintain the required speed and torque, while at the same time exhibiting increased efficiency of operation and improved operator experience. In one aspect, the disclosed design also allows a dry clutch to be utilized, improving compactness and simplicity.

It will be appreciated that the foregoing description provides examples of the disclosed system and process. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features, previously known or otherwise, is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A dual mode EPPV transmission hybrid electric drive system for propelling a machine using a combination of power sources, the drive system comprising:
    an internal combustion engine having an engine output for providing rotational power;
    a first electric motor having an output for providing rotational power;
    a second electric motor having an output for providing rotational power; and
    a transmission for receiving rotational power from the internal combustion engine, first electric motor, and second electric motor, and for combining the received rotational power into a transmission output power for propelling the machine, the transmission including:
        a first planetary gear set including a first sun gear linked to a first ring gear via a pinion on a first carrier, the first ring gear receiving rotational power from the engine output and the first sun gear being rotationally fixed to the first electrical motor;
        a second planetary gear set including a second sun gear linked to a second ring gear via a pinion on a second carrier, the second carrier being rotationally fixed to the first carrier and to a transmission output, and the second ring gear being rotationally fixed to the second electrical motor; and
        a first clutch selectively linking the first sun gear to the second sun gear and a second clutch selectively braking the second sun gear such that when the first clutch is engaged, the transmission exhibits a first mode of power transmission characteristics and when the second clutch is engaged the transmission exhibits a second and distinct mode of power transmission characteristics.

2. The dual mode EPPV transmission hybrid electric drive system according to claim 1, further comprising a controller electrically linked to the internal combustion engine, the first electric motor, the second electric motor, the first clutch, and the second clutch and being programmed to control the mode of power transmission characteristics of the transmission by selectively engaging and disengaging the first clutch and the second clutch, and to control the power and speed output of the transmission in each mode by controlling the operation of the internal combustion engine, the first electric motor, and the second electric motor.

3. The dual mode EPPV transmission hybrid electric drive system according to claim 1, wherein the first mode of power transmission characteristics provides a first range of engine input to transmission output ratios and the second mode of power transmission characteristics provides a second range of engine input to transmission output ratios that is higher than the first range of ratios.

4. The dual mode EPPV transmission hybrid electric drive system according to claim 3, wherein rotational power from the internal combustion engine is supplied to one of the first electric motor and the second electric motor in one of the first mode and the second mode, such that electrical energy is generated thereby.

5. The dual mode EPPV transmission hybrid electric drive system according to claim 1, wherein the first clutch and the second clutch are dry clutches.

6. The dual mode EPPV transmission hybrid electric drive system according to claim 1, wherein a shift between the first mode and the second mode is synchronous.

7. A dual mode EPPV transmission hybrid electric drive system for propelling a machine using a combination of power sources, the drive system comprising:
   an internal combustion engine having an engine output for providing rotational power;
   a first electric motor having an output for providing rotational power;
   a second electric motor having an output for providing rotational power; and
   a transmission for receiving rotational power from the internal combustion engine, first electric motor, and second electric motor, and for combining the received rotational power into a transmission output power for propelling the machine, the transmission including:
      a first planetary gear set including a first ring gear linked to a first sun gear via a pinion on a first carrier, the first sun gear receiving rotational power from the engine output and the first ring gear being rotationally fixed to the first electrical motor;
      a second planetary gear set including a second ring gear linked to a second sun gear via a pinion on a second carrier, the second carrier being rotationally fixed to the first carrier and to a transmission output, and the second sun gear being rotationally fixed to the second electrical motor; and
      a first clutch selectively linking the first ring gear to the second ring gear and a second clutch selectively braking the second ring gear such that when the first clutch is engaged, the transmission exhibits a first mode of power transmission characteristics and when the second clutch is engaged the transmission exhibits a second and distinct mode of power transmission characteristics.

8. The dual mode EPPV transmission hybrid electric drive system according to claim 7, further comprising a controller electrically linked to the internal combustion engine, the first electric motor, the second electric motor, the first clutch, and the second clutch and being programmed to control the mode of power transmission characteristics of the transmission by selectively engaging and disengaging the first clutch and the second clutch, and to control the power and speed output of the transmission in each mode by controlling the operation of the internal combustion engine, the first electric motor, and the second electric motor.

9. The dual mode EPPV transmission hybrid electric drive system according to claim 7, wherein the first mode of power transmission characteristics provides a first range of engine input to transmission output ratios and the second mode of power transmission characteristics provides a second range of engine input to transmission output ratios that is higher than the first range of ratios.

10. The dual mode EPPV transmission hybrid electric drive system according to claim 9, wherein rotational power from the internal combustion engine is supplied to one of the first electric motor and the second electric motor in one of the first mode and the second mode, such that electrical energy is generated thereby.

11. The dual mode EPPV transmission hybrid electric drive system according to claim 7, wherein the first clutch and the second clutch are dry clutches.

12. The dual mode EPPV transmission hybrid electric drive system according to claim 7, wherein a shift between the first mode and the second mode is synchronous.

\* \* \* \* \*